May 5, 1970  S. O. FOX  3,510,098
SLIP FORM APPARATUS

Filed June 22, 1967  6 Sheets-Sheet 1

INVENTOR:
SAMUEL O. FOX
BY:
Mason, Kolehmainen, Rathburn & Wyss
ATT'YS

INVENTOR:
SAMUEL O. FOX

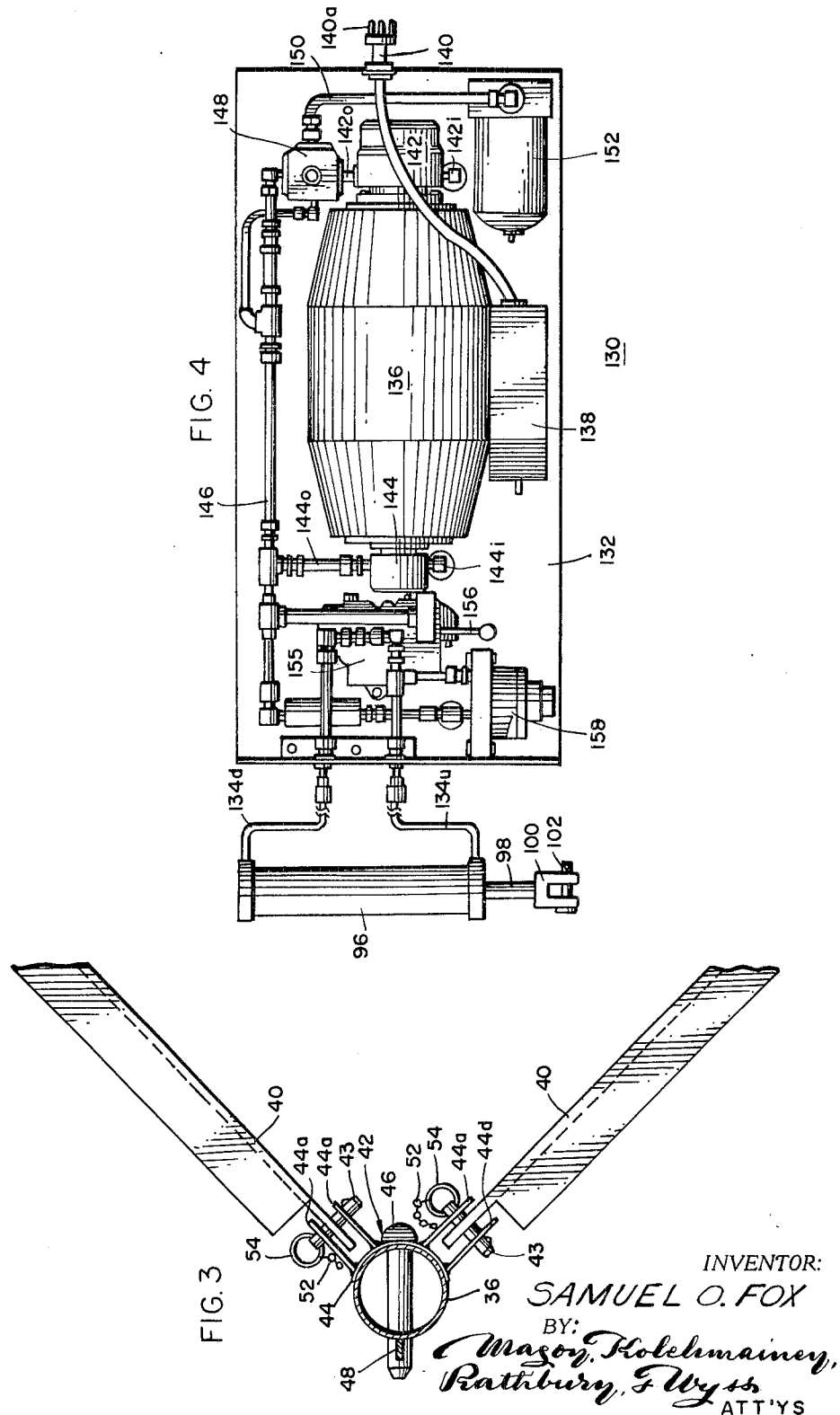

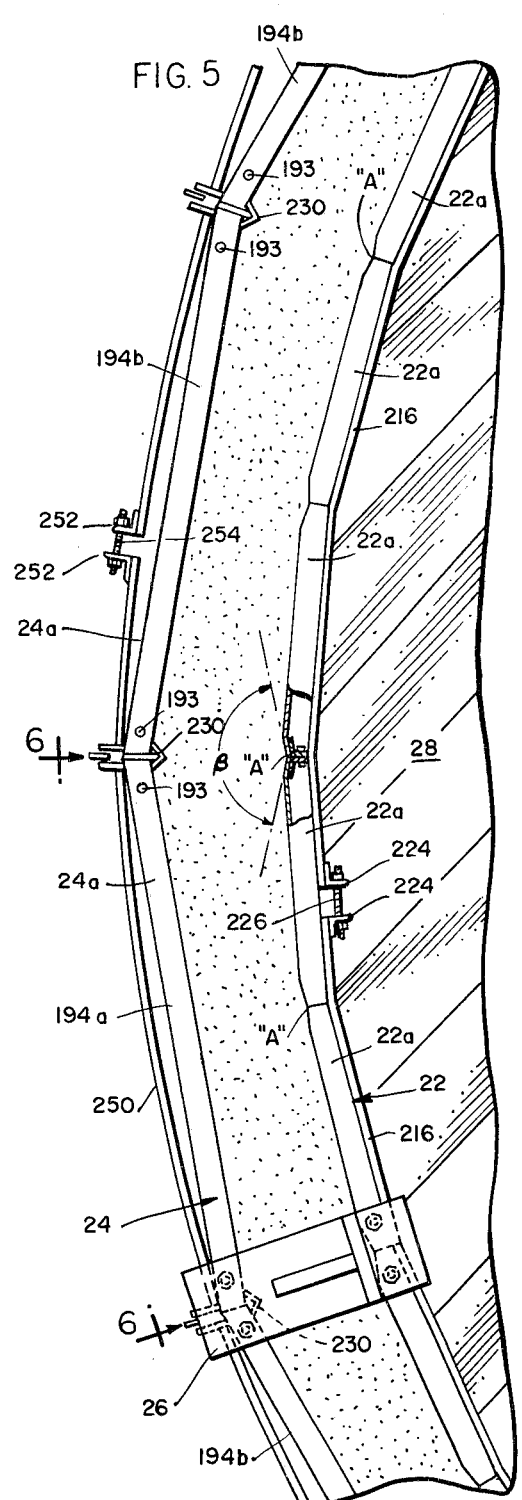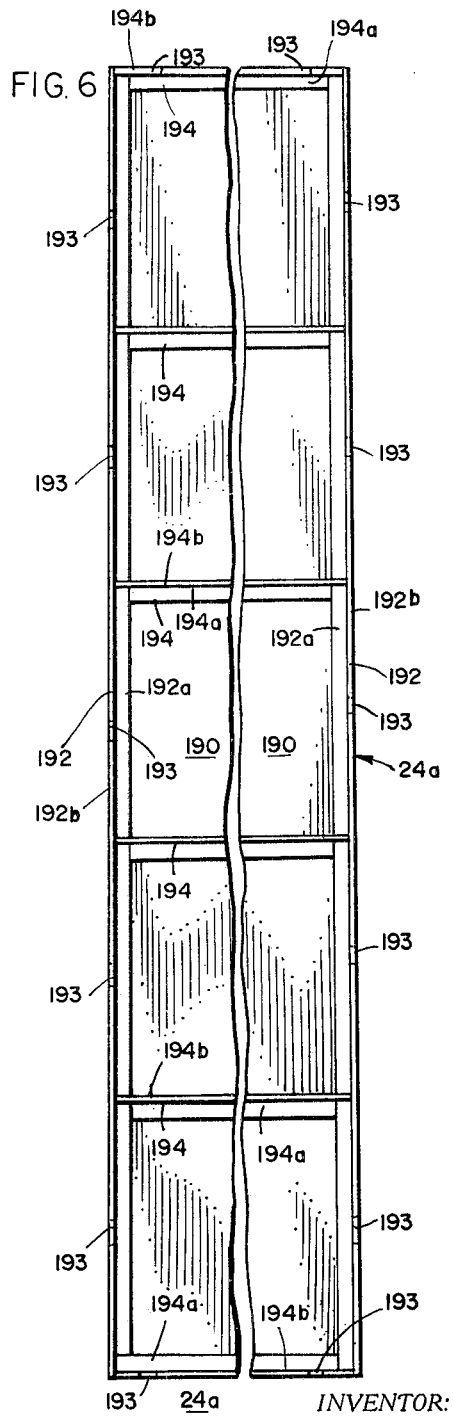

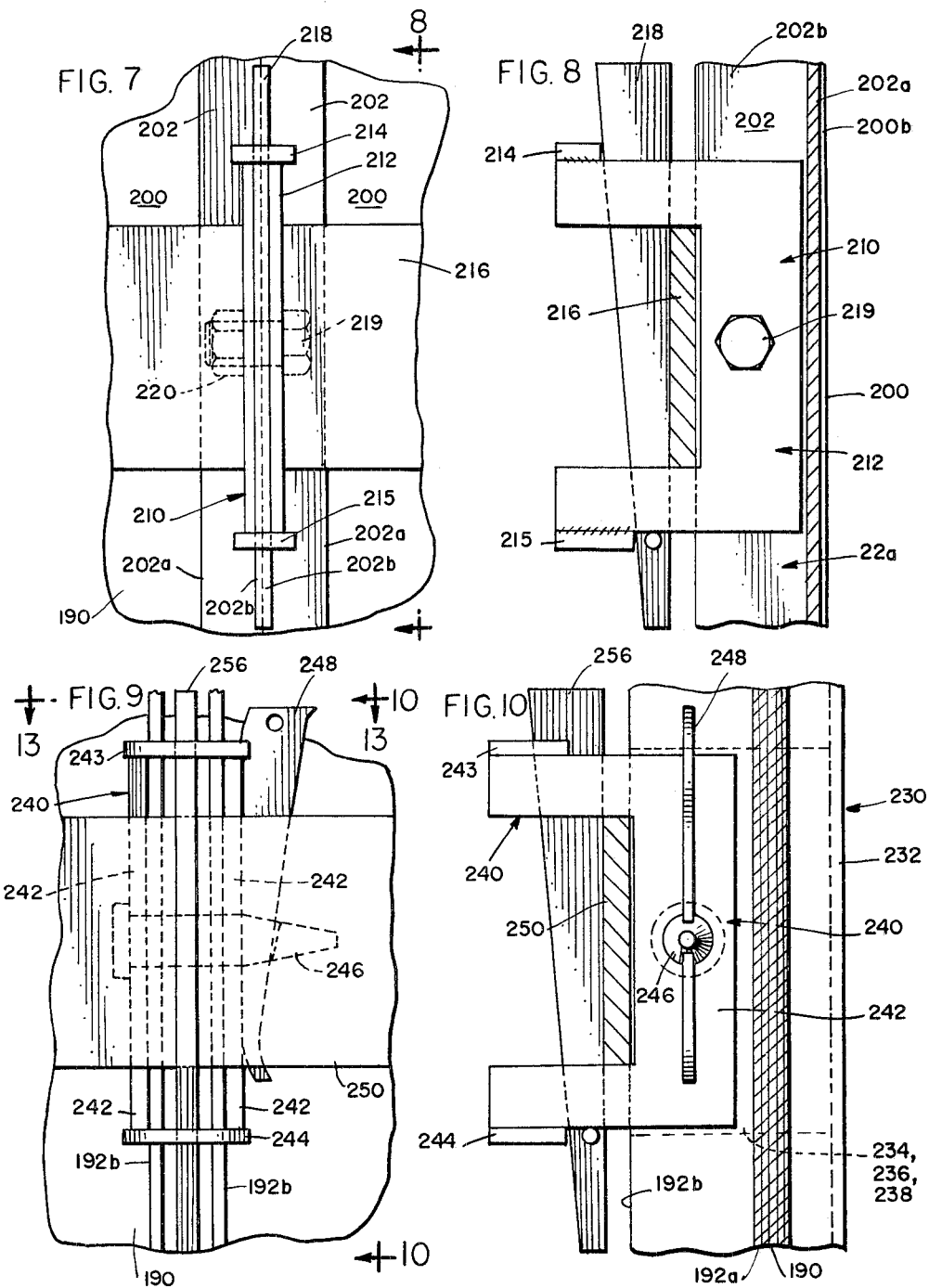

May 5, 1970  S. O. FOX  3,510,098
SLIP FORM APPARATUS
Filed June 22, 1967  6 Sheets-Sheet 6
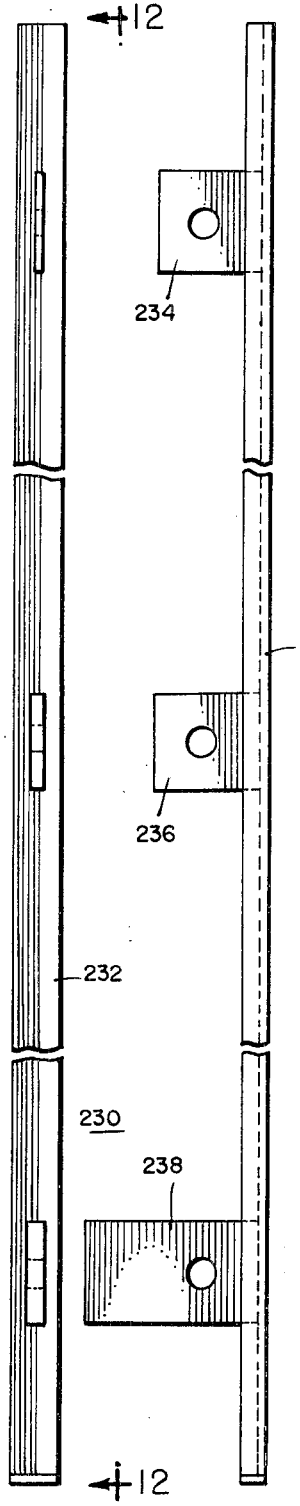
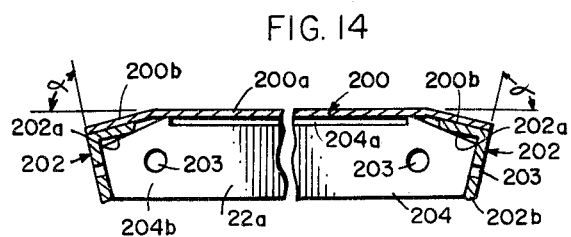
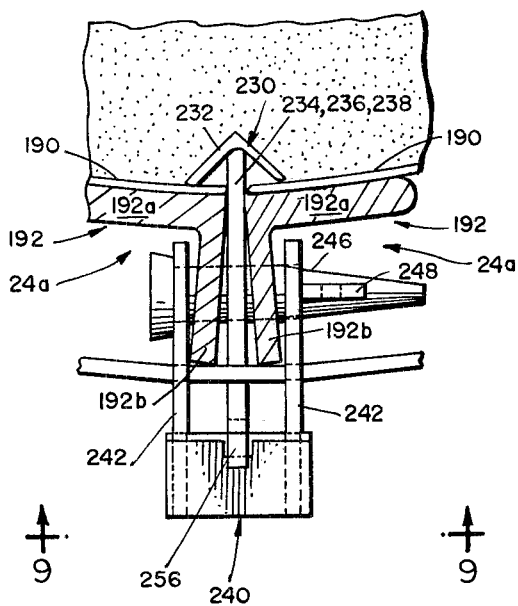
INVENTOR:
SAMUEL O. FOX
BY
ATT'YS United States Patent Office 3,510,098
Patented May 5, 1970

3,510,098
SLIP FORM APPARATUS
Samuel O. Fox, Hanover Park, Ill., assignor to De Muth Steel Products Company, Schiller Park, Ill., a corporation of Illinois
Filed June 22, 1967, Ser. No. 647,998
Int. Cl. E04g 11/20
U.S. Cl. 249—20
14 Claims

ABSTRACT OF THE DISCLOSURE

A slip form assembly for use in building hollow, tubular, upwardly extending, poured concrete structures, such as silos, chimneys, storage bins, and the like, including a tubular inner form wall and a tubular outer form wall facing the inner wall and spaced outwardly therefrom to permit concrete to be poured between the walls and formed thereby. Means are provided for structurally interconnecting the inner and outer form walls adjacent their upper ends and means are provided for maintaining a selected spacing between the facing inner and outer form walls with the spacing adjacent the upper ends of the two walls being less than the spacing adjacent the lower ends of the form walls. Accordingly, one of the form walls is tapered with respect to the other and is movable upwardly with greater ease during the slip forming operation.

The present invention relates to a new and improved slip form assembly and, more particularly, to a new and improved slip form assembly adapted for use in building hollow, tubular, vertically extending, poured concrete structures, such as silos, chimneys, storage bins, elevator shafts, and the like.

The present invention is particularly directed to a slip form assembly adapted for use in building vertical silos and chimneys which are poured on a continuous, or semi-continuous basis, and, accordingly, the slip form structure is supported independently of the poured walls and is raised by means external to the poured walls as the pouring process proceeds to higher levels. Because poured concrete silos, chimneys, etc., are oftentimes constructed at remote locations where it is difficult to get large, heavy equipment in and out easily, it is desirable to provide a new and improved slip form assembly which can be readily assembled and disassembled, and one which can be easily transported from one location to another when in the disassembled or knocked-down condition.

Another object of the present invention is the provision of a new and improved slip form assembly of the type described which can be rapidly assembled and disassembled to make the use of the form assembly more economical by saving time at each different jobsite or location where a poured concrete structure is to be built.

Another object of the present invention is to provide a new and improved slip form assembly of the type described having a new and improved design whereby the slip form assembly slides smoothly upwardly without interference, binding, rotation, or tilting and, consequently, the poured concrete structure produced therein is of high quality.

Still another object of the present invention is the provision of a new and improved vertically movable slip form assembly wherein one forming wall is sloped slightly in relation to the vertical, thereby making it possible to periodically support the form assembly on the poured wall itself without other external supports.

Briefly, the foregoing and other objects and advantages of the present invention are accomplished by a new and improved vertically movable slip form assembly of the character described, including a tubular inner form wall and a tubular outer form wall facing and spaced therefrom. Support means are provided for structurally interconnecting the inner and outer form walls adjacent their upper ends, and means are provided for maintaining a selected spacing between the facing inner and outer form walls whereby the spacig adjacent the upper ends is somewhat less than the spacing adjacent the lower ends. Accordingly, one of the form walls is tapered outwardly at the bottom with relation to the opposite form wall, and the entire form structure can thus be supported periodically on the poured concrete wall alone while readjustments are made in the form lifting and supporting equipment. The entire form assembly is normally supported entirely independently of the concrete structure being poured by means of a scaffold structure and a work platform. The scaffold structure is disposed within the poured wall structure and extends vertically upward with additional scaffold sections being added from time to time as the pouring height increases. The work platform is supported from the scaffold structure with a lifting mechanism adapted to elevate the forms at the desired rate until the pouring is completed. After the concrete pouring is completed, the forms are knocked down or disassembled and lowered to the ground on the work platform. As the platform is lowered, sections of the scaffold structure above the platform are disassembled, and when the platform reaches the ground, the disassembled scaffold and form components are loaded onto vehicles for transportation to the next jobsite and the work platform itself is likewise disassembled for transportation. The entire mechanism in a knocked down condition is transported by truck or other vehicle to another jobsite where the components are reassembled and the process is repeated.

For a better understanding of the present invention, reference should be had to the following detailed description taken in conjunction with the drawings, in which:

FIG. 3 is a fragmentary horizontal sectional view taken along the line 3—3 of FIG. 1 and showing a detailed view of a typical scaffold post assembly in accordance with the invention;

FIG. 4 is a schematic plan view of the hydraulic control system used for elevating the slip form structure of the invention;

FIG. 5 is a horizontal cross-sectional view through a fragmentary portion of the poured wall illustrating the inner and outer form walls of the slip from assembly in greater detail;

FIG. 6 is a backside elevational view of a typical individual form panel used in the outer form wall taken substantially along the line 6—6 of FIG. 5;

FIG. 7 is an enlarged fragmentary detailed view illustrating connector means for connecting adjacent individual form panels making up the inside form wall of the assembly;

FIG. 8 is an elevational view looking in the direction of the arrows 8—8 of FIG. 7;

FIG. 9 is a view similar to FIG. 7 but illustrating typical connector means and spacers used for joining adjacent form panels making up the outer form wall of the assembly;

FIG. 10 is a side elevational view looking in the direction of the arrows 10—10 of FIG. 9;

FIG. 11 is a rear elevational view of a spacer member in accordance with the invention, used for maintaining the desired spacing between form panels in the outer form wall;

FIG. 12 is a side elevational view of the spacer means of FIG. 11 looking in the direction of the arrows 12—12;

FIG. 13 is an enlarged, fragmentary horizontal sectional view looking downwardly in the direction of the arrows 13 of FIG. 9; and FIG. 14 is a transverse sectional view through a typical inside form panel used in the slip form assembly of the invention.

Referring now, more particularly, to the drawings, therein is illustrated one embodiment of a new and improved slip form assembly 20 constructed in accordance with the features of the present invention and adapted especially for use in building vertical, tubular, poured concrete structures, such as silos, chimneys, storage bins, elevator shafts, and the like.

Figure 1:
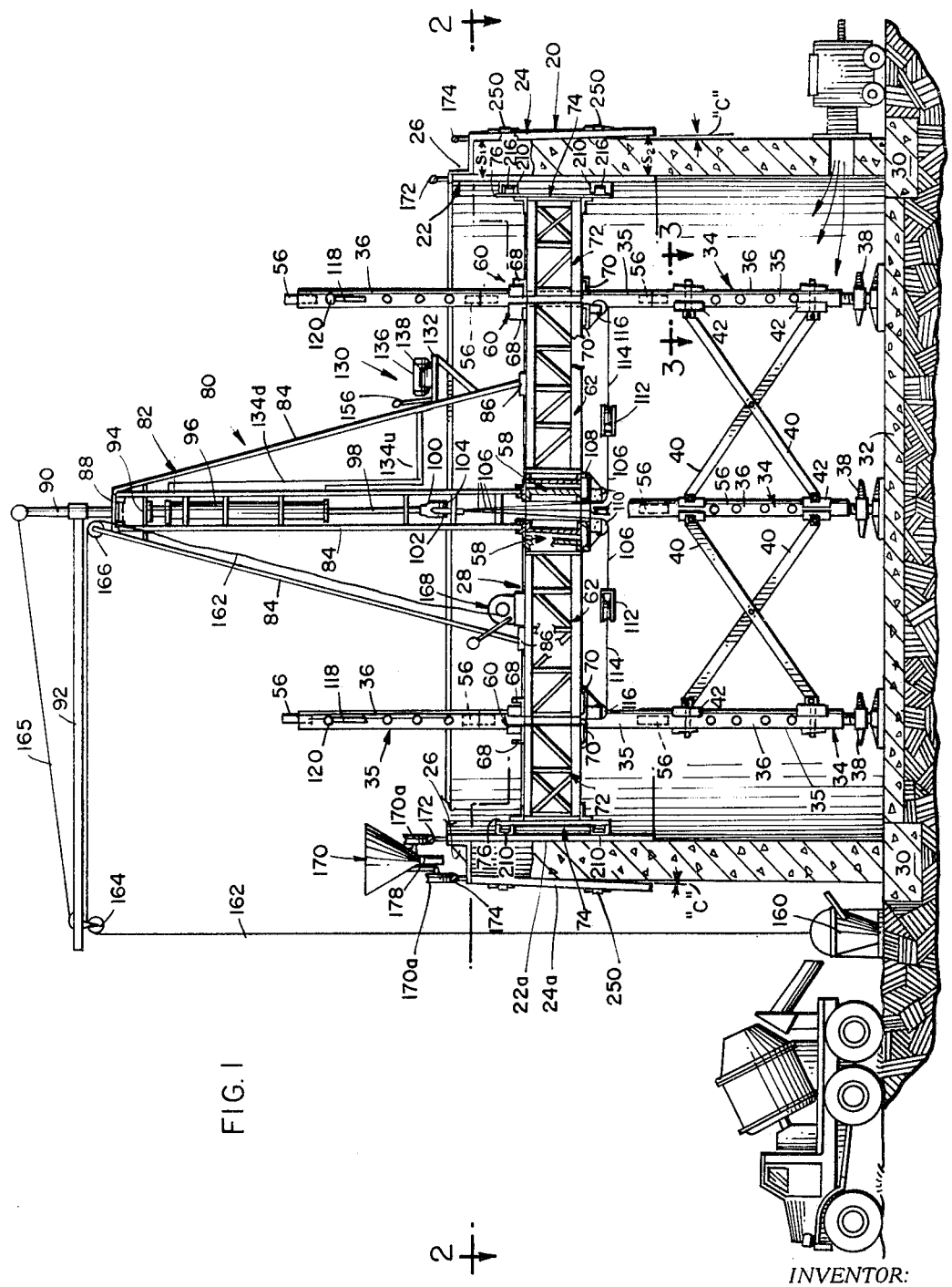
FIG. 1 is a cross-sectional view on a vertical plane through a tubular, poured concrete silo or chimney under construction with a slip form assembly in accordance with the present invention.
Figure 2:
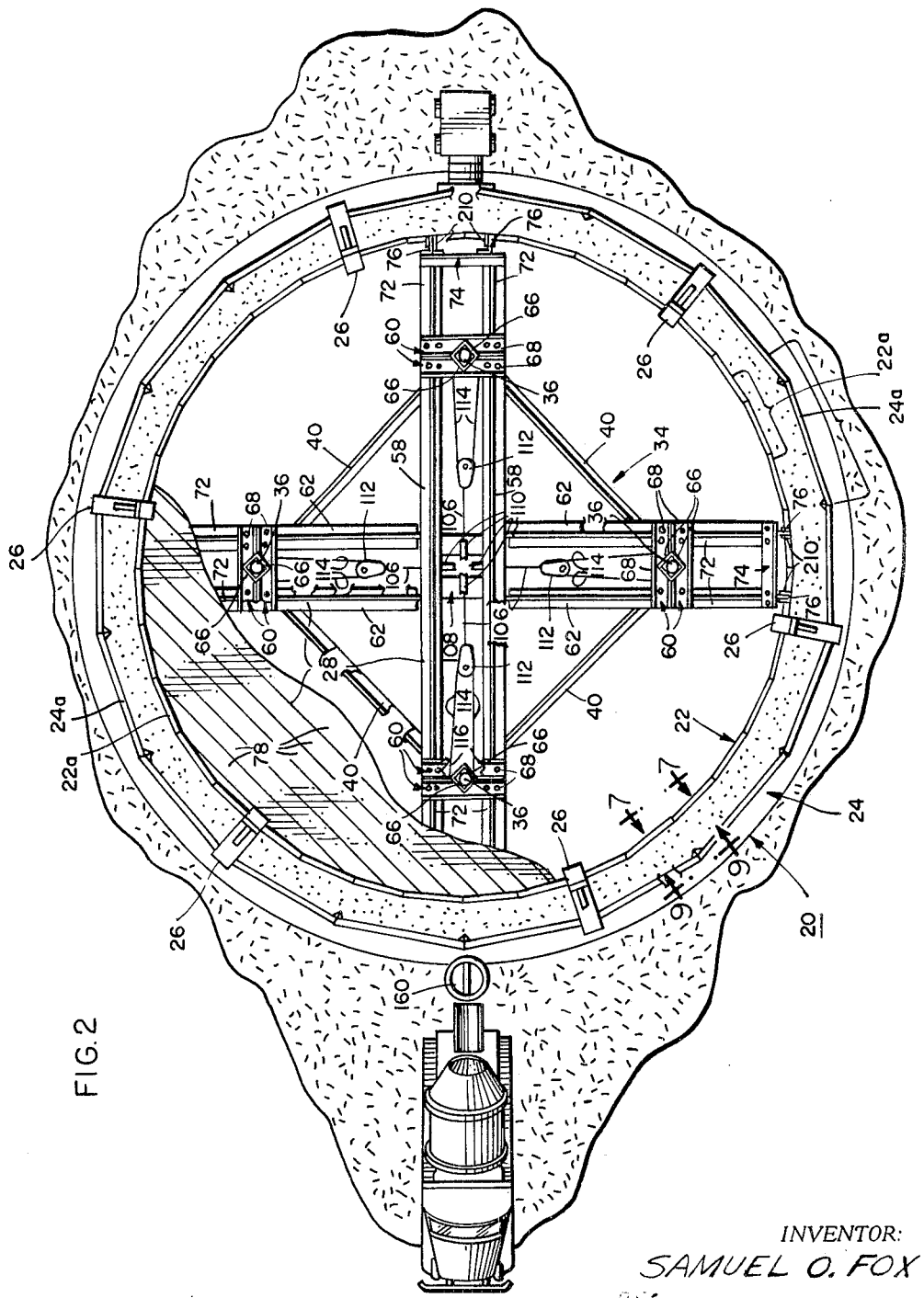
FIG. 2 is a horizontal, transverse cross section taken substantially along line 2—2 of FIG. 1.

The slip form assembly 20 includes a continuous, tubular, inner form wall 22 and an outer form wall 24 spaced outwardly in facing relation therewith. The inner and outer form walls are each made up from a plurality of generally rectangular, individual form panels 22a and 24a, respectively, which are interconnected in side-by-side relation. The assembled form walls 22 and 24 are held in facing relation to each other at a selected spacing distance in order to provide for the desired wall thickness of the concrete structure being poured. Interconnection of the form walls into an integral unit is accomplished by means of a plurality of radially outwardly extending support brackets 26, as best shown in FIGS. 1, 2, and 5. The support brackets 26 are bolted to the top flanges on the upper ends of the inner form panels 22a and project outwardly over and are bolted to the top edge of the form panels 24a. The brackets 26 thus tie the inner and outer form walls together into the integral slip form assembly 20 which can be raised or lowered as a unit.

The form panels 22a and 24a which make up the inner and outer form walls, are relatively small in size and are easily handled individually when disassembled from one another. For example, inner form panels 22a having a width of about one foot and a height of about six feet and outer form panels 24a having a width of about two feet and a height of about six feet have been used in constructing farm silos having 28-foot diameters and wall thicknesses of six to eight inches. Accordingly, about forty-four outer form panels were required to make up the outer form wall 24, and some eighty-two inner form panels were required for the inner form wall 22. In a knocked down condition, all of these form panels for a job of this size can be stacked in piles on the bed of a single truck, and relatively small space is required for storage and transportation. The number of form panels required for buildling a given structure naturally depends upon the diameter or size and shape of the structure, and the wall thicknes thereof. Form panels 22a and 24a of standard sizes, as in the example described, and various filler panels of smaller or larger widths can be inserted into the outer or inner form walls to provide for almost any size or shape of structure that is desired.

After the inner and outer form panels have been assembled together to make up the completed tubular form walls 22 and 24, a plurality of ring bands or walers are used to strengthen the structure and the inner and outer walls are interconnected by the radial support brackets 26 which maintain the proper spacing therebetween.

Generally, before the walls of a silo or chimney are poured, a suitable footing or supporting base 30 (FIG. 1) is poured in place in the ground and, if desired, a floor slab 32 is poured in place prior to construction of the walls. A vertically movable, horizontal work platform 28 is then assembled within and connected to the completed slip form structure 20 which is resting on the footing 30, and the work platform and slip form assembly is then elevated upwardly by means of a vertical scaffold structure 34 and lifting mechanism to carry the slip from structure upwardly as the walls of the silo or chimney being constructed are poured.

The slip form assembly 20 is supported completely independently of the chimney or silo walls being poured and, accordingly, the walls can be poured rapidly while the forms are raised on a continuous or semicontinuous basis.

The vertically extending scaffold structure 34 is centrally disposed within the walls of the concrete structure being poured and includes a plurality of sections 35 vertically stacked, one upon the other. As the slip form assembly is raised, additional scaffold sections 35 are stacked onto the scaffold structure until the pouring is completed. The scaffold structure supports both the slip form assembly 20 and the work platform 28, and the work platform and scaffold structure are interconnected by a lifting mechanism which is especially designed to elevate or lower the platform at a controlled rate. After pouring is completed, the slip form assembly 20 is knocked down and the individual form panels and other components are stacked on the work platform which is lowered down the scaffold until reaching the ground or floor 32. During this procedure, the scaffold sections 35 above the platform are dismanteled from the scaffold structure below the platform and when the platform reaches the lowest level only a single scaffold section remains to be dismantled. The work platform and last scaffold section 35 are then dismantled and the entire mechanism is then transported to the next jobsite.

Referring now, more specifically, to the scaffold structure 34, which includes a plurality of vertically stacked, individual, scaffold sections 35, each section includes a plurality of vertically extending, hollow, corner posts 36. Each post is provided with a plurality of vertically spaced, transverse holes formed therein. The posts 36 in the lowest or first scaffold section 35 are mounted on heavy duty screw jacks 38 which are adjustable to level the posts and insure that the scaffold structure extends vertically upward and does not tilt or slope to one side or the other as additional sections are added.

The corner posts in each scaffold section 35 are rigidly tied together with the adjacent posts by means of a pair of X-braces 40 formed of angle iron or the like, and the X-braces 40 in each pair are pivotally interconnected at their midpoints by pivot pins or bolts. Opposite ends of the X-braces are connected to the respective posts 36 by means of removable corner bracket fixtures 42 and pins 43 (FIG. 3). Each bracket fixture includes a semicylindrical base member 44 adapted to fit against the surface of the post, and the base is secured in place by a pin 46 which extends through a hole in the post. A wedge 48 is driven through a slot adjacent the outer end of the pin to hold the fixture and pin tightly in place. Each pin 43 is inserted through an opening provided adjacent the outer ends of the X-brace 40 and the pins extend through aligned holes in a pair of lugs 44a disposed on opposite sides of the brace. The lugs 44a are welded to the base 44, and two pairs of lugs 44a, each pair extending at right angles to each other (FIG. 3), are provided when a four-post scaffold system is used. Preferably, each pin 43 is loosely connected to one of the lugs 44a by a chain 52 and ring 54 so that the pins do not become lost or separated from their bracket fixtures.

In setting up the first or lowest scaffold section 35, the corner posts 36 are placed on the jacks 38 and properly leveled. Pairs of X-braces 40 are connected to the posts 36 by means of the bracket fixtures 42, pins 43 and 46, and wedges 48, as described. Later on, as the work platform 28 and slip from assembly 20 is moved upward on the scaffold structure 34, additional scaffold sections 35 are added to increase the height of structure 34 and these posts of the additional sections are keyed onto the posts of the next lower sections by means of upwardly projecting pipe stubs or keys 56 which are (FIG. 1) telescopically inserted and secured in the upper ends of each scaffold post 36. The pipe stubs or keys 56 support and hold the posts of the next scaffold section in vertical alignment until the posts can be interconnected with the X-braces 40. The posts 36 are of convenient lengths with appropriately spaced holes therein to accommodate the bracket pins 46 and cable holding pins, which will be fully described in detail hereinafter.

It should be noted that while the scaffold structure 34, which is illustrated, has four corner posts, a scaffold structure could have more or less than four, depending to a large extent upon the cross section of the concrete structure to be poured. In any event, a plurality of posts are provided rather than a single, supporting pole structure in order to provide lateral stability so that horizontal forces, such as wind, are resisted by the scaffold structure itself, as well as the poured concrete walls of the structure that is being built.

The work platform 28 supports and is connected to the inner form wall 22 of the slip form assembly 20 and is adapted to move up and down on the scaffold structure 34. The work platform includes a structural, cross-type supporting framework, as best shown in FIGS. 1 and 2, and the platform can be easily disassembled or knocked down into relatively small individual components, none of which are bulky or large enough to create problems in transportation or handling. Referring specifically to FIG. 2, the cross-type framework includes a first pair of parallel chord sections 58 which are interconnected and held in spaced apart relation at opposite ends by a pair of end sections 60 which will be described in greater detail hereinafter. The platform framework includes two pairs of shorter, parallel chord sections 62 extending transversely outwardly in opposite directions from opposite sides of the central portion of the longer chord sections 58. The short chord sections 62 in each pair are interconnected and held in spaced apart relation at their inner ends by bolted attachment with the chord sections 58 and at their outer ends by end sections 60. The chord sections 58 and 62 of the platform framework are generally similar to each other, and each includes an upper and lower flange interconnected by vertical and diagonal struts in a manner similar to that found in typical trusses or bar joist type structures. Accordingly, the supporting framework of the platform 28 is strong, relatively light in weight, and is easily assembled and disassembled for transportation.

Referring specifically to FIG. 2, the end sections 60 used to interconnect the parallel chord sections 58 and 62 at their outer ends are substantially identical, and each includes a vertical extending guide angle 66 which is adapted to slide against a corner post 36 of a scaffold structure. The guide angle 66 in each end section 60 is supported by an upper cross angle 68 which extends transversely across and is bolted to the upper flanges of the respective parallel chord sections 58 and 62, and a lower cross channel 70 is provided to support the lower end of the guide angle beneath the chord sections. Each end section 60 thus includes a vertical guide angle 66 supported by cross members 68 and 70 which are bolted to the upper and lower flanges at the ends of the parallel chord sections.

In order to interconnect the outer ends of the respective parallel chord sections 58 and 62 with the inside form wall 22, the platform framework includes pairs of relatively short outer chord sections 72 similar in construction to the chord sections previously described, but generally shorter in length. The inner ends of the outer chord sections 72 are bolten to the outer ends of the respective chord sections 58 and 62. Spacing is maintained by end sections 60 having vertical guide angles 66 which face and are identical with the guide angles between the outer ends of the chord sections 58 and 62. Each post 36 of the scaffold structure thus extends upwardly through the work platform with a pair of vertical guide angles 66 disposed on opposite sides thereof. The outer ends of each pair of outer chord sections 72 are tied together with outer end sections 74 which are generaly similar to the end sections 60 but include a pair of vertical angles 76 adapted to be connected to and support the inner form wall 22 of the slip form assembly 20.

Once the cross-shape platform framework has been assembled within the slip form assembly 20 which is resting on the footing 30, wood planking 78 is laid diagonally across the framework, as best shown in FIG. 2, to provide a suitable surface for supporting men and equipment. At this time, the bottom edge of the slip form assembly is resting on the footing and the corner posts 36 of the first scaffold section 35 project upwardly between the facing pairs of guide angles 66.

The work platform 28 is interconnected to the scaffold structure 34 for vertical movement thereon by means of a lifting mechanism generally indicated by the numeral 80 (FIG. 1). The lifting mechanism includes an A-frame tower structure 82 comprising four ladderlike structural members or legs 84 which are pivotally secured at their lower ends to the cross-type framework of the work platform by pivot pins 86. The upper ends of the tower legs 84 are all interconnected together by a horizontal tie member 88 and a short post or column 90 extends upwardly thereof to help support a horizontally outwardly extending lift arm 92.

The A-frame structure 82 mounted on the platform 28 includes a horizontal tie structure 94 adjacent the upper end adapted to the support of the upper end of a powerful, vertically extending hydraulic cylinder 96 having a piston rod 98 extending downwardly from the lower end of the cylinder with a clevis 100 mounted on the lower end of the rod. The legs of the clevis 100 are adapted to receive a removable, horizontal cross pin 102 on which are attached a plurality of eyebolt fittings 104 secured on the upper ends of a plurality of central lifting cables 106. The lifting cables extend downwardly from the clevis and pass through an open area in the central portion of the work platform 28 to the underside thereof. The cables are directed radially outward towards the respective corner posts 36 of the scaffold structure 34 along the underside of the work platform by means of pulleys or sheaves 110 which are mounted on a pulley base structure 108. The base structure 108 is mounted on the underside of the work platform 28 at the central portion where the chord members 58 and 62 intersect, and includes a plurality of short channel members bolted to the lower flanges of the chord sections. At the outer end of each cable 106 is provided a pulley block 112 for interconnection with a lifting cable 114. The outer lifting cables are looped around the pulleys in the pulley blocks 112 and extend outwardly thereof toward the respective corner posts 36 of the scaffold structure 34.

Adjacent the outer ends of each pair of chord sections 58 and 62 are mounted a pair of pulleys 116 which are supported from the underside of lower cross-channel members 70. The outer lifting cables 114 are trained around the pulleys 116 and directed upwardly thereby along opposite sides of each post 36, respectively. The opposite ends of each cable 114 are provided with eyebolt fittings 118 which are adapted to be attached to the post by means of removable pins 120 inserted into the appropriately located holes in the corner post. In this manner the upper end of each scaffold post 36 is connected to the lifting cylinder 96 via an outer cable 114 and inner cable 106 which cables pass under and support the framework of the work platform 28.

When hydraulic fluid under high pressure is introduced into the lower end of the lifting cylinder 96, the central lifting cables 106 are pulled upwardly with respect to the work platform 28 and, accordingly, the pulley blocks 112 move radially inwardly toward the center of the work platform. As this occurs the work platform 28 is slowly hoisted or elevated upwardly on the scaffold structure 34 at a rate which is controlled by the rate of movement of the piston rod 98 upwardly in the cylinder 96. As the work platform 28 approaches the upper ends of the four corner posts 36 in one scaffold section 35, four pairs of X-braces 40 are interconnected between these posts beneath the platform to strengthen the structure and four new posts are then mounted on the respective pipe stubs 56 projecting upwardly from the posts in the lower sections. Momentarily, the piston rod 98 is lowered in the cylinder 96 to relax the tension on the cables 106 and 114, and the pins 120 are withdrawn from their respective posts. The pins with the eyebolt connection 118 on the upper ends of the cables 114 are then inserted into holes adjacent the upper ends of the new posts added to the scaffold structure. High pressure fluid is then supplied to the lower end of the lifting cylinder 96, causing the rod 98 to retract and again exert lifting tension on the cables. The work platform 28 moves upwardly at a controlled rate in this manner, and each time the work platform reaches the upper end of a scaffold section 35, the posts of the next section are mounted in place and the elevation upward is momentarily halted while the cables are connected to the new posts. This cycle is repeated for each additional scaffold section 35 added to the scaffold structure until the pouring of concrete is completed. During the short periods, while the cables are disconnected from the posts, the work platform is suspended by the poured walls, as will be fully described hereinafter.

In order to control the movement of the piston rod 98 in the cylinder and supply the force required to elevate the work platform and slip form assembly on the scaffold, the lifting system 80 includes a hydraulic control mechanism 130 which is located on a small platform 132 supported from one of the ladderlike legs 84 of the A-frame tower structure 82. Preferably, the platform 132 is in the form of a hollow boxlike structure and serves as a reservoir for holding a supply of hydraulic fluid for the system. The hydraulic system is operatively connected with opposite ends of the cylinder by an up line connection 134U and a down line connection 134D, as shown schematically in FIG. 4, and when pressurized fluid is delivered to the up line 134U the piston rod 98 is retracted upwardly into the cylinder 96, causing the work platform 28 and slip form structure 20 to move upwardly at a controlled rate. When fluid pressure is delivered to the down line 134D, and when fluid in the lower end of the cylinder is permitted to pass out through the line 134U, the piston rod 98 moves downwardly in the cylinder 96 permitting the work platform 28 and the slip form structure 20 to descend. The hydraulic control system 130 includes an electric motor 136 controlled by a switch box 138 and connected to a convenient source of electric power by a cable 140 and plug 140a. A pair of hydraulic pumps 142 and 144 are mounted at opposite ends of the motor and are directly connected to the rotor shaft. The pump 142 is larger in capacity than the pump 144 and both pumps have inlet ports connected directly to the fluid in the reservoir 132 by inlet conduits 142i and 144i, respectively. The outlet or pressure side of the pumps 142 and 144 are connected to a common manifold assembly 146 by outlet pipes 142o and 144o, respectively, and a pressure relief valve 148 is provided in the outlet line 142o to bypass excessive fluid supplied to the manifold through a relief line 150 into the reservoir.

The output from both pumps 142 and 144 passing into the supply manifold 146 is delivered to a control valve 155 having one outlet connected with the upside line 134U and another outlet connected with the downside line 134D. The valve 155 includes a control lever 156 movable between a neutral position wherein pump pressure in the manifold 146 is bypassed directly to the reservoir, an upside position wherein high pressure fluid is directed to the upside line 134U at a selectively controllable rate, and a downside position wherein high pressure fluid is directed into the line 134D at a selectively controlled rate. When the control lever 156 is in the neutral position, hydraulic fluid is trapped in both ends of the cylinder and the piston rod is stationary. When hydraulic pressure is directed into the downside line 134D the upside line 134U is connected to the reservoir via a controllable bleeding valve 158, and when hydraulic pressure is directed into the upside line 134U, the downside line 134D is connected to the reservoir through the valve 155. The valve 158 acts as a governor and prevents rapid movement of the piston rod, so that the platform will not be elevated or descend at too rapid a rate. The rate at which high pressure fluid is directed into either end of the cylinder is primarily controlled by the position control lever 156, and the valve 158 acts as a safety device.

From the foregoing description, it can be seen that the hydraulic control system 130 is adapted to supply the power to raise or lower the work platform 28 and slip form assembly 20 on the scaffold structure 34 at a selectively controlled rate, and even though relatively large forces are involved, movement of the slip forms is accomplished smoothly by use of a single, centrally located hydraulic cylinder 96 which is connected with each post of the scaffold structure via the cable system, as described.

In order to elevate the concrete which is poured in the slip form structure 20 from the ground level to the pouring level of the forms, a dump bucket 160 is attached to one end of a hoisting cable 162 which is supported by a sheave or pulley 164 mounted adjacent the outer end of the arm 92 which projects horizontally outwardly from the A-frame structure 82. A cable or other brace 165 extends from the top of the post 90 to the outer end of the arm 92 to help support the arm 92 when heavily loaded. The lift cable 162 passes around the sheave 164, inwardly toward the tower structure 82 and then around another sheave 166 and downwardly to an electric or gasoline driven winch 168. The concrete dump bucket 160 is thus raised and lowered under the control of an operator on the work platform.

In order to distribute concrete from the bucket 160 around the slip form structure 20 between the inner and outer form walls 22 and 24, a hopper car 170 is mounted for movement around a trackway on the top of the slip form structure. The hopper car 170 includes two pairs of supporting wheels 170a which will roll along an inner rail 172 and an outer rail 174 supported from the upper end of the inner and outer form walls 22 and 24, respectively. A load of concrete in the dump bucket 160 is delivered into the hopper car 170 which is movable around the trackway to the desired position, whereupon a discharge chute 178 on the hopper car is opened to discharge the concrete between the form walls 22 and 24.

Referring now, more specifically, to FIGS. 1 and 5 through 14, the outer form wall 24 of the slip form assembly 20 is comprised of a plurality of individual form panels 24a (best shown in FIGS. 5 and 6) which are assembled together in side-by-side relationship to form the hollow, tubular, form wall structure.

Each outer form panel 24a includes a rectangular, front, planar face or wall-forming member 190 preferably constructed of sheet metal or plywood. The panel 190 is mounted on a framework comprising a pair of vertically extending side members 192 connected by a plurality of spaced apart, transverse rib members 194. The side members 192 and transverse ribs 194 are preferably made of angle iron and are arranged with flanges 192a and 194a abutting the rear face of the panel 190. The flanges 192b and 194b extend rearwardly of the front panel 190 and perpendicular thereto, and each flange is provided with a plurality of spaced apart holes 193 therein to facilitate joining adjacent panels together. Preferably the front panel 190 is welded or bolted to the flanges 192a and 194a of the framework, and each individual panel 24a so constructed is relatively light in weight and easy to handle.

The inside form panels 22a are of slightly different struction than the outside form panels 24a. Referring specifically to FIGS. 5 and 14, it will be seen that each inside form panel 22a includes a wall forming front panel 200 preferably constructed of sheet metal and fabricated to have a large planar central portion 200a and a pair of angularly rearwardly deflected side edge portions 200b formed along opposite vertical edges of the central portion. Each inside form panel includes a framework, preferably constructed of angle iron with a pair of vertically extending side members 202 along opposite edges thereof and a plurality of horizontal, spaced apart ribs 204 extending between the side members. Flanges 202a of the side members 202 are secured against the back faces of the respective side edge portions 200b of the panel 200 and flanges 202b extend rearwardly perpendicular thereto forming the acute angles α (FIG. 14) between the central panel portion 200a and the rearwardly extending side member flanges. The ribs 204 include flanges 204a abutting the rear face of the central panel portion 200a and rearawardly extending flanges 202b perpendicular thereto. The flanges 204b of the ribs and the flanges 202b of the side members 202 are provided with a plurality of spaced holes 203 to facilitate joining the inner form panels together into an integral form wall. When the panels 22a are joined in side-by-side relation to form the hollow, tubular, inner form wall 22 (FIG. 5), the flanges 202b of adjacent panels are bolted together and the panel edge portions 200b on adjacent panels form obtuse angles B. Accordingly, the inside surface of the poured concrete wall includes vertically extending, shallow rib formations "A" of triangular cross section and these ribs help prevent the slip form structure 20 from rotating or twisting as it is elevated. The ribs "A" also help in guiding the slip form structure to move upwardly on a true vertical and reduce the chances of tipping or tilting of the form structure and consequent binding resulting therefrom.

Each panel is bolted to adjacent panels on opposite sides and a pair of clip assemblies 210 (FIGS. 7 and 8) are provided to facilitate attachment of a pair of inner walers 216 to the inner worm wall 22. Each clip assembly includes a pair of U-shaped (FIG. 8) side plates 212 held in spaced apart parallel relation by a distance equal to double the thickness of the flanges 202b of the side members 202 of the form panels. The parallel U-shaped plates 212 are joined by an upper cross member 214 and a lower cross member 215 which are welded to the legs of the side plates adjacent the outer ends thereof. It should be noted that the upper cross member 214 is thinner than the lower member 215 in order to accommodate a vertical wedge member 218 which is driven between the spaced side plates 212 to force the inside form waler 216 outwardly against the rear edges of the form panel side flanges 202b. The waler 216 is formed of steel plate in several sections and helps to tie the individual form panels together into a strong, tubular, form structure. The legs of the U-shaped side plates 212 on each clip assembly are above and below the upper and lower edges of the waler and the bight portions of the side plates are bolted to the form panels with bolts 219. The bolts 219 extend through selected holes 203 in the side flanges 202b of the form panels, and after the clip members are bolted in place and nuts 220 are tightened, sections of the waler 216 are inserted between the upper and lower legs of the side plates 212 and the wedges 218 are driven into place for securing the waler around the inside of the form wall 22.

The waler 216 is made up of a plurality of curved sections, each having angle clips 224 at opposite ends thereof (FIG. 5). The angle clips 224 on adjacent walers are connected by bolt members 226 (FIG. 5) forming a continuous cylindrical band around the inside of the assembled form wall 22, helping to tie the individual panels together into an integral unit. Preferably, there are at least two walers 216 around the inside form walls 22 (FIG. 1) and if the vertical dimensions of the form panels are increased, additional walers can be added.

From the foregoing, it can be seen that the inside form panels 22a are readily assembled together by bolting with the U-shaped clip assemblies 210 supported by the bolts. The walers 216 are supported by the clip assemblies and are held in place by the wedges 218. The outer chord sections 72 on the work platform 28 are connected to the walers 216 and support the inside form wall 22 and the entire slip form structure 20. For this purpose, the vertical angles 76 (FIG. 1) at the ends of the outer chord sections are each provided with a pair of U-shaped clip assemblies 210 bolted thereon. The upper and lower walers 216 are held between the legs of side plates 212 of these clip assemblies, and wedges 218 are used to secure the walers in place. From the foregoing description, it is clear that the inner form walls 22 is supported by the outer ends of the chord sections 72 on the work platform 28, and the assembled inner form wall 22 can be connected to or disconnected from the work platform by inserting the wedges 218 on or removing the from the clip assemblies 210 on the angles 76.

In accordance with the present invention, the individual outer form panels 24a are assembled into the integral outer form wall 24 with the side flanges 192b of adjacent panels held in spaced apart relation by vertically extending spacer members 230 (FIGS. 11 and 12). Each spacer member 230 includes a vertically extending angle or cover member 232 and a plurality of rearwardly propecting spacer lugs 234, 236, and 238 welded thereto. The lug 234 is of thinner material than the lug 236 which is of thinner material than the lub 238, so that the spacing distance between adjacent panel side flanges 192b is greater at the bottom of the form panels than it is at the top.

The angles 232 of the spacer members 230 are orientated to project outwardly of the front faces of the adjacent form panels 190 (FIG. 13) thereby forming vertical V-shaped grooves in the outer surface of the silo wall as the slip form structure is elevated. The angles 232 serve a dual function in guiding the forms upwardly in a truly vertical direction and, in addition, serve to cover the spacing or openings between the side flanges 192b of adjacent form panels caused by the spacing lugs 234, 236, and 238. The lugs themselves are sandwiched between the facing side flanges on adjacent panels and each lugs has a drilled opening therein in alignment with one of the holes 193 in the flange.

When the panels 24a and spacer members 230 are assembled together, as shown in FIG. 13, the lower ends of the panels are flared outwardly and the spacing between individual opposing inside and outside form panels 22a and 24a is greater at the bottom than at the top. The assembled outer form wall 24 is substantially frustoconical in shape while the inner form panels 22a are truly vertical.

The tapered spacing between the inside and outside form walls 22 and 24 permits the slip form structure 20 to be elevated more easily during a pour and thus reduces the tendency of the form structure to tilt and bind as it moves upwardly. Referring to FIG. 1, it can be seen that the outer form panels 24a diverge outwardly at the bottom and are tapered with respect to a true vertical as represented by the angle "C." This tapering of the outer form panels is accomplished by using the new and unique spacer members 230 with the spacer lugs 234, 236 and 238 of different thicknesses.

While the outer form wall 24 is shown in the illustrative embodiment as tapering outwardly at the bottom away from the vertical inner form wall 22, it is to be understood that the inner form wall could be tapered inwardly at the bottom away from a vertical outer form wall or, in fact, both inner and outer walls could be tapered with respect to the vertical to provide greater spacing at the bottom than at the top between the walls without departing from the spirit of the invention.

The spacing members 230 and adjacent outer form panels 24a are preferably interconnected by clip assemblies 240 (FIGS. 9, 10 and 13) generally similar to the clip assembly 210 previously described. Each clip assembly 240 includes a pair of U-shaped side plates 242 held in spaced apart parallel relation by an upper cross member 243 and a lower cross member 244. The U-shaped side plates 242 have openings in the bight portions thereof for receiving a headed pin 246 having a long, tapered end portion with a transverse slot adjacent the tip. The pins 246 are secured in place with wedges 248 driven through the slot in the pin and biasing the side plates 242 against the flanges 192b on adjacent outer form panels.

The outer form wall 24 is strengthened with a pair of outer walers 250 similar to the walers 216 previously described. Each waler 250 comprises several longitudinal curved sections joined together by means of angle clips 252 and bolts 254 (FIG. 5), to provide a continuous cylindrical band to absorb tension stress and prevent outward spread of the forms. The clip assemblies 240 are mounted on adjacent form panel flanges 192b and the pins 246 and wedges 248 inserted to hold the panels together with the spacer members 230 in place with their lugs 234, 236, and 238 between the edges of the adjacent panels. The waler bands 250 are then inserted in place between the upper and lower outwardly extending legs of the U-shaped side plates 242, and wedges 256 are inserted to positively hold the walers in place.

The apparatus of the present invention provides a means for rapidly pouring a concrete silo, chimney, elevator shaft, grain bin, etc., from the ground up until the desired pouring height is reached. The forming assembly and associated mechanism can be rapidly disassembled and reassembled at the jobsite and provides for a uniform high quality poured concrete structure.

Although the present invention has been described with reference to a single illustrative embodiment thereof, it should be understood that numerous other modifications and embodiments can be devised by those skilled in the art that will fall within the spirit and scope of the principles of this invention.

What is claimed and desired to be secured by Letters Patent of the United States is:

1. A slip form assembly for use in forming one face of an upwardly extending poured concrete curved wall comprising a plurality of individual form panels in side-by-side relation, each panel including a wall forming front face and a pair of upwardly extending side flanges along opposite side edges thereof, said flanges extending rearwardly of and generally transversely of said front face, spacer means disposed between a pair of adjacent and facing side flanges on a pair of adjacent form panels for maintaining a selected minimum spacing between the side edges of said panels adjacent their upper ends and a greater spacing between the side edges of said panels adjacent their lower ends so that the form panels diverge outwardly at the bottom, and means for securing adjacent panels together with said spacer means in between.

2. The slip form assembly of claim 1 wherein said spacer means includes an upper spacer of selected thickness and a lower spacer of greater thickness spaced downwardly thereof, and an elongated, upstanding, groove forming cover member interconnecting said spacers and disposed along said panel front faces for covering the space between said facing side flanges and guiding said assembly laterally during upward travel on said poured wall.

3. The slip form assembly of claim 2 wherein said cover member is of convex-concave, transverse cross section and is positioned with the convex surface thereof facing outwardly of the front faces of said panels.

4. The slip form assembly of claim 2 wherein said cover member is of angular transverse cross section and is positioned with its apex spaced outwardly of the front faces of said panels and the outer edges of its flanges bearing against respective front faces of adjacent panels.

5. The slip form assembly of claim 1 including waler means for holding adjacent form panels with their front faces in angular relation to each other whereby the concrete wall to be formed is generally concave-convex in horizontal cross section.

6. The slip form assembly of claim 5 including a plurality of connectors, each of said connectors including means for interconnecting said waler means with pairs of facing side flanges on adjacent panels and said spacer means between said flanges.

7. The slip form assembly of claim 1 including a form wall spaced from said first mentioned form panels, said form wall comprising a plurality of second form panels interconnected in side-by-side relation, each of said second form panels including a front face and a pair of upwardly extending side flanges along opposite edges thereof, said front faces of said second form panels including a central portion and a pair of side edge portions adjacent said side flanges, said side edge portions being disposed in vertical planes angularly divergent from each other and from said central portion.

8. The slip form assembly of claim 7 including waler means for holding adjacent ones of said first mentioned form panels in angular relation to each other whereby the concrete wall to be formed is generally concave-convex in horizontal cross section.

9. The slip form assembly of claim 8 including second waler means for holding said second form panels in angular relation with one another to thereby form the concave surface of said concrete wall.

10. A slip form assembly for use in constructing upwardly extending, poured, concrete tubular structures, such as silos, chimneys, storage bins, and the like, comprising a tubular inner form wall and a tubular outer form wall facing said inner wall and spaced outwardly thereof, at least one of said form walls comprising a plurality of individual form panels in side-by-side relation, support means for structurally interconnecting said inner and outer form walls adjacent their upper ends, and spacer means between form panels in one of said form walls for maintaining a selected horizontal spacing between said facing inner and outer form walls, said spacing adjacent the upper edges between said inner and outer form walls being less than the spacing adjacent the lower edges between said inner and outer form walls.

11. The slip form assembly of claim 10 wherein the wall forming face of one of said form walls is substantially vertical and the wall forming face of the other facing form wall is sloped to be closer to the vertical wall at the upper end than at the lower end thereof.

12. The slip form assembly of claim 10 wherein each of said form walls comprises a plurality of individual form panels in side-by-side relation, each of said form panels including a front, wall forming face and a pair of upwardly extending side flanges along opposite edges of said face, means for interconnecting the side flange of adjacent panels, and spacer means associated with one of said form walls for holding the side flanges of a pair of adjacent side-by-side form panels in spaced apart relation whereby the spacing between adjacent panels in the form wall at their upper ends is less than the spacing between said panels at their lower ends.

13. The slip form assembly of claim 12 including a plurality of elongated cover members associated with said one form wall, each cover member mounted on said form wall to cover a space between adjacent form panels for preventing leakage of concrete through said spaces.

14. The slip form assembly of claim 13 wherein said elongated cover members are of convex-concave transverse cross section with the convex surface thereof facing the concrete poured between said form walls thereby forming a vertical groove in said concrete, said groove and cover member cooperating to prevent rotation of said slip form assembly during elevation thereof on said poured concrete structure.

References Cited

UNITED STATES PATENTS

| | | | |
|---|---|---|---|
| 1,235,542 | 8/1917 | Bagby | 249—47 X |
| 1,375,109 | 4/1921 | Rossiter et al. | 249—17 |
| 1,554,420 | 9/1925 | Donley | 249—33 X |

J. SPENCER OVERHOLSER, Primary Examiner

M. O. SUTTON, Assistant Examiner

U.S. Cl. X.R.

25—131; 249—1